A. GERDES.
CANE HARVESTER.
APPLICATION FILED MAY 11, 1909.

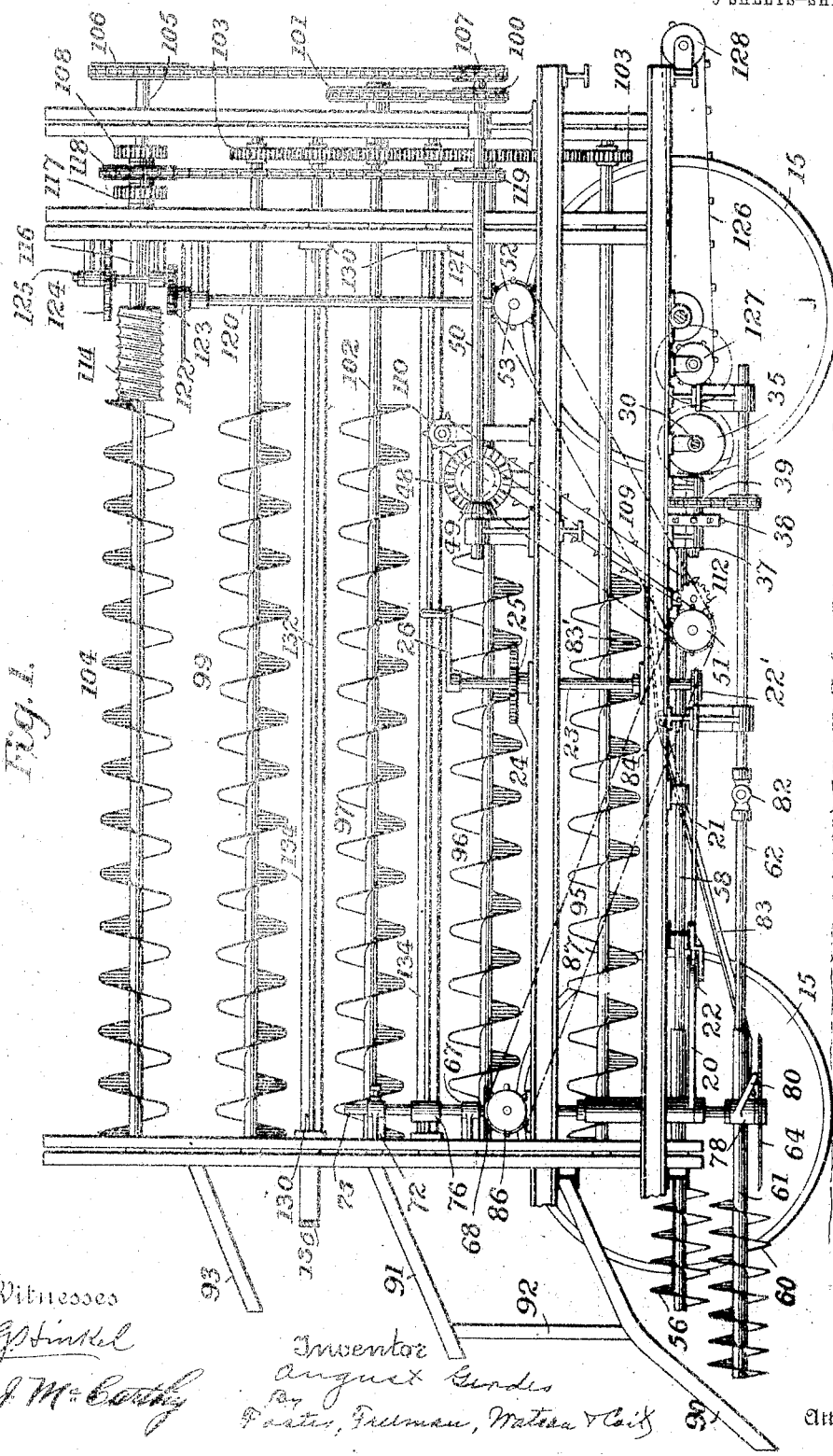

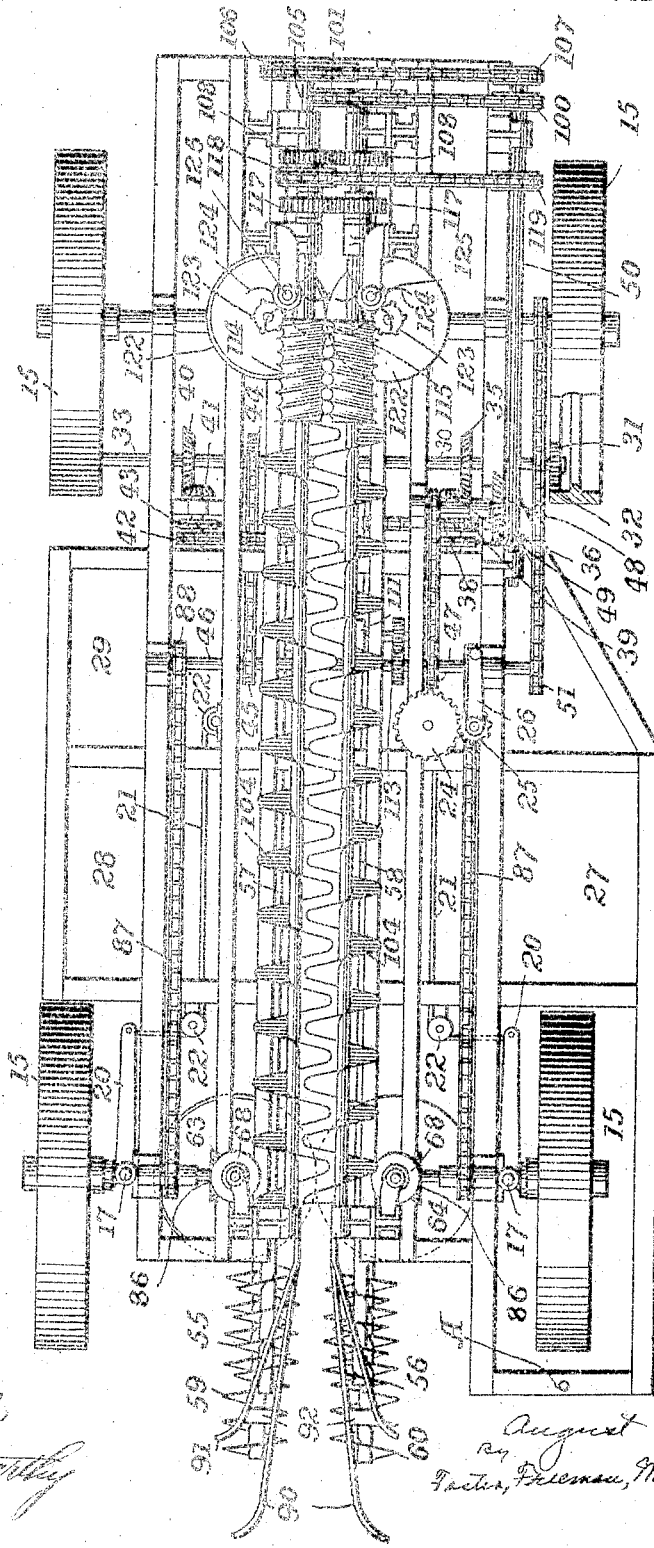

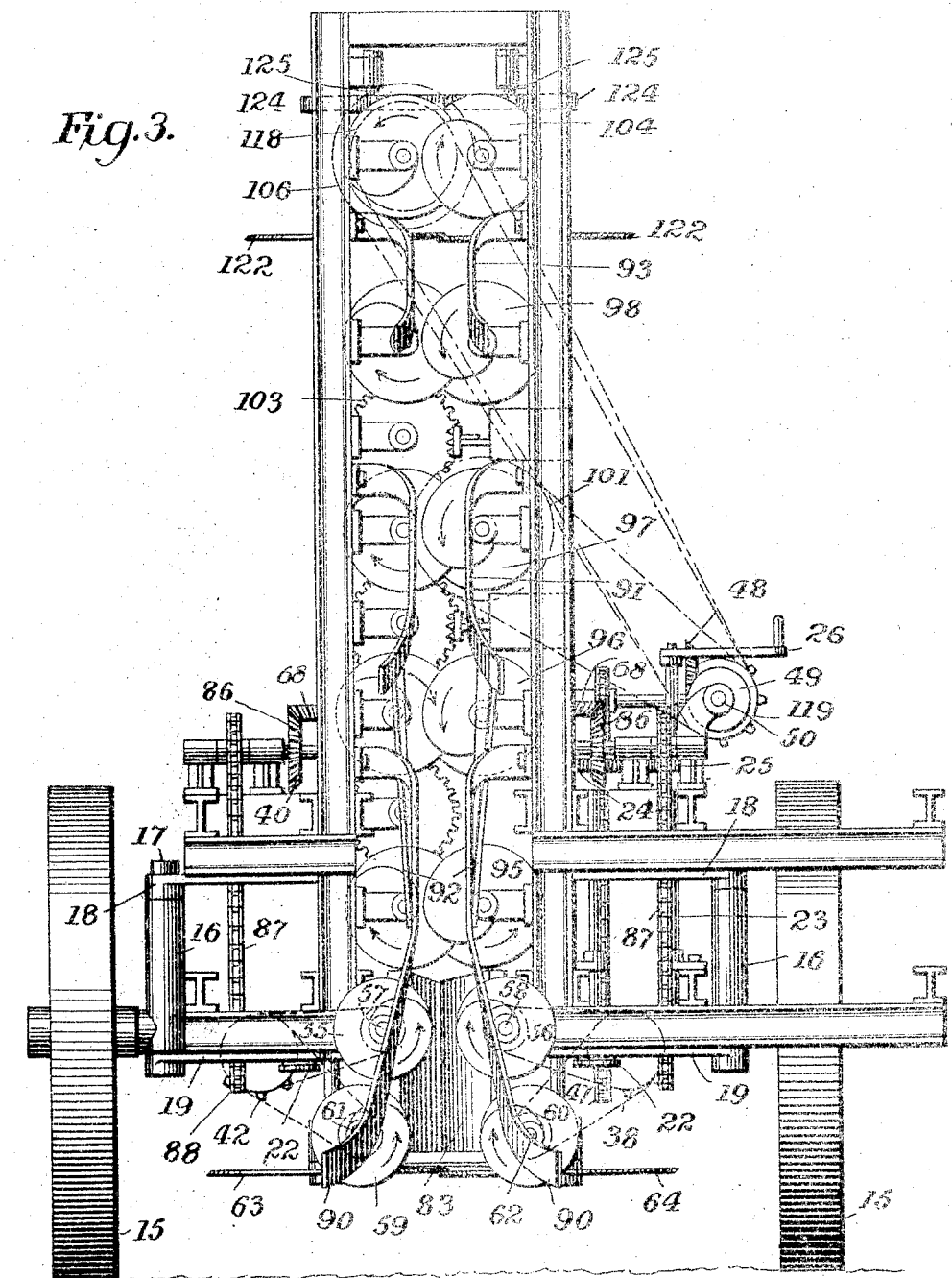

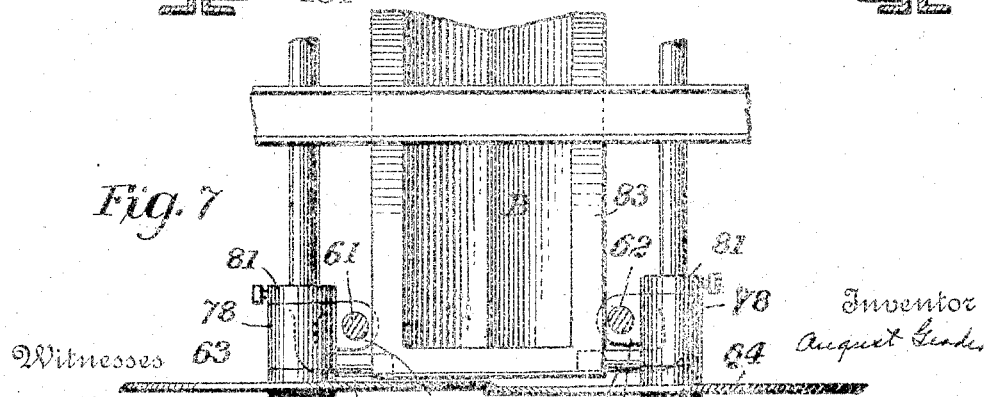

1,022,313.

Patented Apr. 2, 1912.
5 SHEETS—SHEET 5.

UNITED STATES PATENT OFFICE.

AUGUST GERDES, OF GRETNA, LOUISIANA.

CANE-HARVESTER.

1,022,313.  Specification of Letters Patent.  Patented Apr. 2, 1912.

Application filed May 11, 1909. Serial No. 495,289.

*To all whom it may concern:*

Be it known that I, AUGUST GERDES, a subject of the German Empire, and resident of Gretna, Jefferson parish, Louisiana, have invented certain new and useful Improvements in Cane-Harvesters, of which the following is a specification.

This invention relates to harvesters for cane, corn and broom corn.

The object of this invention is to construct a machine which will gather up the blown down stalks, cut them, strip them of all leaves, cut off the tops, and then drop the stripped stalks onto a conveyer where they may be loaded into a wagon or thrown on the ground.

The machine may be moved either by animal power or by an engine. The framework is constructed of structural steel and mounted on wheels. On the front of the machine are mounted two pairs of gathering screws which gather the blown down stalks and move them into the bite of a number of screw conveyers at the same time the stalks are cut by means of a pair of disk knives. These screw conveyers are edged and in this way cut off the leaves from the stalk by means of a draw cut. While the stalks are in engagement with the conveyers they are given an upward movement; mechanism in the form of roughened or corrugated bars engage the stalks in their passage through the conveyers and impart to them a rotative movement, whereby it is insured that every part of the stalk will come in engagement with the knives. After the stalks are cleaned they are fed by a special pair of feeding rolls to the top cutter. These feeding rolls are of such a construction and are so located with reference to the knives that the stalk is cut always at a predetermined distance below the tassel. After the tops have been cut off the bodies of the stalks are discharged upon an elevator which may discharge them upon the ground or load them on a wagon. The tops are discarded by means of doffer wheels located above the rolls.

Figure 8:
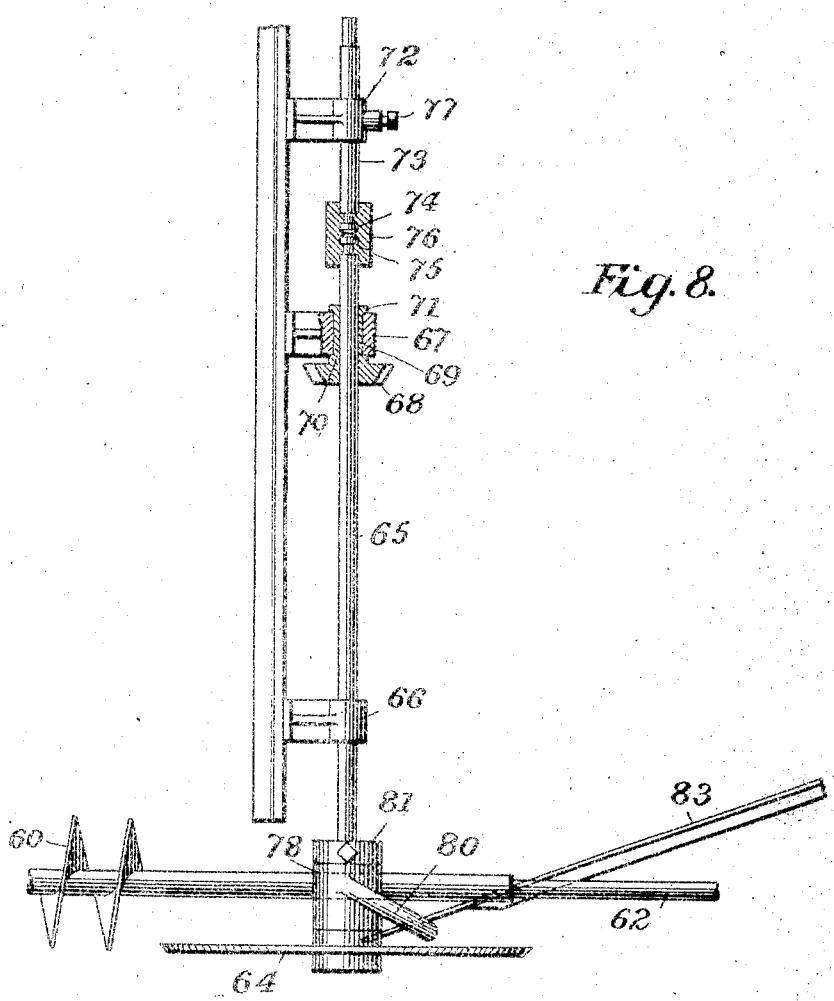
Figure 9:
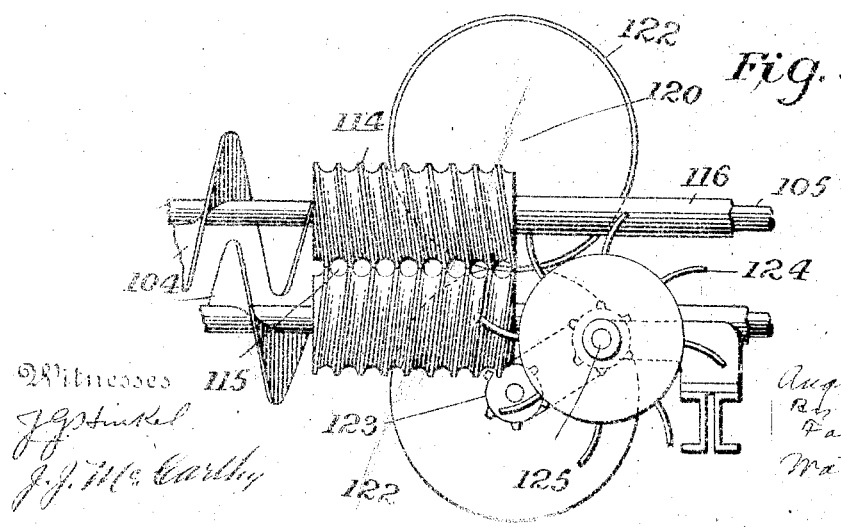

In the drawings: Figure 1 is a side elevation of the harvester; Fig. 2 is a plan view; Fig. 3 is a front elevation; Fig. 4 is a detail of the stalk revolving bar in side elevation; Fig. 5 is a detail front elevation of the same; Fig. 6 is a detail plan view of the same; Fig. 7 is a detail front elevation of the stalk cutting knives and the platform or bridge; Fig. 8 is a detail view showing the adjusting means for the cutting knives, platform or bridge and the gathering screws; and Fig. 9 is a detail plan view of the feeding screws, the top cutting knives and the doffer wheel.

The frame of the machine is preferably formed of structural steel and supported on four wheels 15. The front wheels, as clearly shown in Fig. 3, are mounted upon bearings attached to sleeves 16, which are pivotally mounted on pivot pins 17 mounted in bearings 18, 19, rigidly connected to the frame of the machine. Rigidly connected to the sleeves 16 are arms 20. A band or chain 21 passes around a number of loose pulleys 22 and pulley 22' on a shaft 23 mounted in bearings in the frame. This shaft has connected to it a spur gear 24 with which meshes a pinion 25 having connected to it a handle 26. The handle 26 and the coöperating parts constitute the steering mechanism for the machine.

This machine may be drawn either by animal power or propelled by an engine. If drawn by animal power the tongue is attached on the left side of the machine at the point A. If propelled by an engine, this engine is mounted in the space 27.

28, 29 form spaces for tanks and tool boxes.

Across the frame of the machine extends the main shaft 30, having mounted upon it a pinion 31, which meshes with an internal gear 32 on the rear wheel rim. Rear wheels 15, 15 are loosely mounted on their axles in the usual way. The shaft 30 may be driven either by internal teeth in one of the rear wheel rims or this shaft may extend clear across, forming an extension 33 which may be provided with another pinion meshing with internal gear teeth in the right-hand rear wheel rim. In this case however a suitable differential gearing must be provided. When the machine is propelled by an engine a chain wheel may extend from the engine shaft to the main shaft 30 to propel the same. This chain wheel is however dispensed with when the machine is drawn by animal power.

The main shaft 30 is provided with a bevel gear 35 meshing with a bevel pinion 36 upon a stub shaft 37. Upon this stub shaft are mounted a pair of chain wheels 38, 39. A second bevel gear 40 on the main shaft 30 meshes with a bevel pinion 41 upon a stub shaft upon which are mounted a pair of chain wheels 42, 43. A chain wheel 44 is mounted on the main shaft 30 and transmits power by means of a chain to a chain wheel 45 connected to a counter shaft 46. A chain wheel 47, mounted upon the shaft 46, transmits, by means of a chain, power to a stub shaft having mounted upon it a bevel gear 48, as shown in Figs. 1 and 2. This bevel gear 48 meshes with a pinion 49 on a shaft 50, extending longitudinally of the machine frame. A chain wheel 51 on the shaft 46 transmits power to a chain wheel 52 on a shaft 53. It will therefore be seen that by means of the gears and chain wheels the power is transmitted from the main shaft to the different counter shafts, each of which, as will be seen later, transmits the power to its separate pieces of mechanism.

A pair of gathering screws 55, 56 are mounted upon their shafts 57, 58, which shafts rotate in bearings in the frame of the machine. Upon these shafts are mounted a pair of chain wheels which connect by chains to the chain wheels 38 and 42, whereby the gathering screws are rotated in opposite directions, as indicated by the arrows in Fig. 3. A second pair of gathering screws 59, 60, are mounted upon a pair of shafts 61, 62 so as to also rotate. These shafts 61, 62 extend longitudinally of the frame, as shown in Fig. 1, and are rotated in the direction of the arrows shown in Fig. 3 by means of chain wheels 39, 43 and chains. A pair of disk knives 63, 64 are mounted in bearings in the position shown in Fig. 3 and cut the stalks fed to them by the gathering screws 55, 56, 59 and 60.

Fig. 8 shows in detail the mounting of the disk knives. Since the mounting of the two knives is similar only one mounting will be described. Referring to Fig. 8, 65 designates a knife shaft to the lower end of which is secured the knife 64. This shaft extends through bearings 66, 67, bolted to the frame of the machine. A bevel gear 68 is splined to the shaft 65. This bevel gear has a hollow hub 69 provided with collars 70 and 71 which position the bevel gears 68 and prevent longitudinal movement thereof. The bearing 67 is of the split type so as to permit the insertion of the hub 69. A third bearing 72 is bolted to the frame of the machine, and through this bearing extends a shaft 73 having a grooved portion forming a collar 74. The shaft 65 has its upper end grooved, forming a similar collar 75. These collars coöperate with a split sleeve 76. A set screw 77, in the bearing 72, permits the shaft 73 to be adjusted vertically and locked in adjusted position. It will be noted that the construction of the collars 74, 75 and the split sleeve 76 allows free rotative movement of the shaft 65 and permits vertical adjustment of the same. Upon the lower end of the shaft 65 is mounted a collar 78 provided with a lug 79, which lug is provided with a bearing for shaft 62, see Figs. 7 and 8. The sleeve 78 is also provided with a lug 80. A collar 81 on the shaft 65 is locked in position by means of a set screw, as shown in Fig. 8. The shaft 61 is provided with a universal joint 82. A platform or bridge 83 is hinged at its upper end at 84 by a suitable pivot pin or any other form of hinge and rests at its lower end upon rounded bearing lugs 85 formed upon the lugs 80.

By means of the construction shown and described, by a single adjustment of the shaft 73 one of the knives and one of the gathering screws and the bridge may be adjusted and the parts may be locked in adjusted position by means of set screws 77. The universal joint 82 permits movement of the lower gathering screws and the rounded lug 85 is of such construction that the lower end of the bridge 83 always rests lightly upon the knives, being however supported by the lugs 85. In the construction shown it is necessary to first adjust the knife and the gathering screw on one side of the machine and thereafter adjust the parts on the other side, but it will be understood that the invention is not limited to this separate adjustment. The knives 63 and 64 are rotated by means of bevel gears 86, 86 driven by means of chains 87, 87 and chain wheels 88, 88 on the shaft 46.

Upon the front of the machine are mounted pairs of gathering bars 90, 90, 91, 91, connected by strips 92, 92. An additional pair of guide bars 93, 93 may be mounted at the upper end of the machine to guide the stalks into engagement with the conveyers and strippers as hereafter described.

Referring to Figs. 1, 2 and 3: 95, 95, 96, 96, 97, 97 and 98, 98, designate combined conveyer and stripper mechanism in the form of screws or helices 99. As shown these screws are mounted in pairs one above the other, the pairs intermeshing, as shown in Fig. 2, so as to form an open space between the spirals for the passage of the stalks. These helices or screws are provided with sharp cutting edges, either plain, as shown in Figs. 1, 2 and 3, or notched in the form of saw-teeth, as shown in Fig. 5. These screws rotate in opposite directions and as shown by the arrows in Fig. 3, downwardly toward the bottom of the stalk. A chain wheel 100 upon shaft 50 transmits power to a chain wheel 101 on a shaft 102 supporting one of the screws. The power is transmitted to the other screws by means of a train of gearing 103, as shown in Fig. 1. A fifth pair of screws or helices 104 are mounted above the other screws upon shafts 105. A chain wheel 106 upon one of these shafts connects by a chain to the second chain wheel 107 upon the shaft 50. By means of spur gears 108 on the shafts 105, 105, and the chain wheel 107, the screws 104 are rotated in opposite directions, as shown by the arrows in Fig. 3. In this case however the direction of rotation is upwardly or toward the top of the stalk. The screws 104 need not be provided with cutting edges as their function is merely to support a stalk and not to strip it.

The inclined bridge 83 has an extension 83' which extends to and feeds the stalks upon a steep conveyer 109 passing over rolls 110, 111. The roll 111 is mounted upon a shaft to which is connected a spur gear 112, meshing with a spur gear 113 on the shaft 46, whereby during the operation of the machine the elevator moves the stalks toward the rear of the machine. It will be noted that the length of the screw portion of the screws 95 and 96 is diminished.

Referring to Figs. 1, 2 and 9, a pair of feeding screws 114 forming stalk receiving recesses 115 are mounted upon sleeves 116, through which sleeves extend the shafts 105. Upon these sleeves are rigidly mounted a pair of intermeshing spur gears 117, and upon one of the sleeves is mounted a chain wheel 118 connected by means of a chain to a chain wheel 119 upon the shaft 50. By means of this independent connection the feeding screws 114 may be driven at a greater or at a less speed than the screws 104. A pair of vertically extending shafts 120 have mounted at their lower ends a pair of bevel gears 121 which mesh with bevel gears upon the shaft 53. Upon the upper ends of the shafts 120 are mounted a pair of disk knives 122. A pair of chain wheels 123, mounted above the disks 122, are connected by chains to a pair of chain wheels upon shafts 125. These shafts support a pair of doffer wheels 124. In the construction shown in Fig. 9 only one doffer wheel is used. A conveyer 126 passes over a pair of rollers 127, 128. The roller 127 has mounted upon its shaft a spur gear which coöperates with a spur gear on the main shaft 30.

In Figs. 3, 4, 5 and 6 are shown the construction of the stalk revolving bars. Since the construction of both bars is identical only one will be described. Referring to Figs. 4, 5 and 6, 130, 130 designate a pair of brackets provided with inclined slots 131. A longitudinally extending bar 132 is provided with a pair of slides or elongated pins 133 which slide in the inclined slots 131. The bar 132 has riveted or otherwise secured to it a plate 134 provided with a number of corrugations 135 extending along the entire length of the bar. These corrugations may be formed in various ways. They may be formed by punching out portions of the plate or strip 134, or by securing sharp pins directly in the bar 132, or the bar 132, or the plate 134, may be merely roughened, the function of this roughened portion being to revolve the stalk in its passage through the machine. The bar 132 is preferably provided with a flaring guide 136 for the purpose of bringing the stalk in engagement with the roughened projections 135.

Referring to Figs. 3 and 5, it will be noted that the bars 132, which are two in number in the construction shown, are positioned between two pairs of screws. The weight of the bar normally retains them in the lowest position with the lugs 133 in the lower ends of slots 131. In this lowest position the bars 132 will extend beyond the center line of the machine, this being the line which is equidistant from the centers of the screws.

The operation of the machine is as follows: The machine is propelled or drawn along a row of cane or corn. The gathering bars 90 and 91 will pick up the stalks which have been blown down by the wind or rain and bring them into the bite of the gathering screws 55, 56, 59 and 60. These gathering screws are revolved at such a speed that the pitch speed is equal to the speed of the machine over the ground, the pitch speed being the distance between two symmetrical points on two successive flights, i. e. the pitch, multiplied by the number of revolutions of the screw in a unit of time. It will therefore be seen that after a stalk is once in engagement with the screw it will be righted and held in vertical position, the lower pair of screws first righting the stalk and the upper pair of screws completing the righting operation. By the united operation of the gathering bars and the gathering screws the stalks are gradually brought closer to the center line of the machine, since it will be noted that the upper pair of gathering screws is located nearer the center line than the lower pair, thereby corresponding with the flare of the gathering bars. The gathering screws and gathering bars feed the stalks to the cylindrical knives 63, 64, which cut off the stalk at a distance above the ground determined by the adjusting mechanism shown in detail in Fig. 8. At the same time that the stalks are in engagement with the cutting knives the upper portions thereof, by means of the gathering bars 91 and the additional guides 93, are guided onto the bite of the revolving screws 99 which engage the stalks which are now righted and in vertical position; hold them in vertical position, and gradually move them through the machine. As the stalks are moved through the machine the sharp cutting edges of the screws strip the stalks of their leaves by a draw cut. After the stalks leave the knives 63 and 64 they are engaged by the inclined platform or bridge 83. Referring to Figs. 3 and 7, it will be noted that this platform or bridge 83 rests upon the surface of the knives and is provided with a trough or V-shaped central portion B, which tends to hold the stalks in central position. The stalks moved on by the conveyer and stripping screws are moved longitudinally and upwardly, due to the incline of the platform or bridge 83. In this manner by giving the stalks an upward movement while engaged by the strippers it is insured that every part longitudinal of the stalk shall be engaged by the stripping knives. The incline of the platform 83 is of course suitably proportioned so that a vertical movement of sufficient amount is given to insure such operation. In their passage through the machine the stalks are also engaged by the roughened bars 132. In this way the stalks are given a rotative movement around their vertical axis while they are moved through the machine whereby it is insured that every part of the stalk will be engaged by the stripping knives. By providing the screws, which are the conveyers themselves, with cutting edges a construction is secured whereby during the stripping operation the strippers are constantly in engagement with the stalks. In this way all tearing and breaking of the stalks is prevented and only the leaves removed.

In the passage of the stalks through the machine the tops of the long stalks are engaged by the retaining screws 104. It will be noted that these screws rotate upwardly toward the top of the stalk and therefore any top coming in engagement will be quickly moved upwardly and thereafter retained in position by the screws which form a rest or stop for the stalk, and since they engage the stalk by the top or tassel, all downward movement and further upward movement is prevented. Since the function of these screws is merely to retain or support the stalk they need not be provided with cutting edges, and, on the other hand, they may be in the form of plain rolls.

The inclined platform or bridge 83 will move the long stalks into engagement with the retaining screws or rolls 104 but in order that the short stalks may also be moved into engagement with these rolls the elevator 109 is provided. The section 83' of the bridge or platform discharges onto this elevator 109 which moves the stalks upwardly, the speed of the elevator being such that the longitudinal component is the same as the feed of the screws. In this way the shorter stalks are elevated so that they are engaged by the retainers 104 and the stalks are supported by the head or tassel in the usual way. The stripping screws and the retaining screws or rolls 104 move all the stalks rearwardly into the bites of the feeding screws 114, which rotate in the same directions as the retaining screws or rolls 104. The stalks will now enter the recesses 115 in the feeding rolls and will be moved in engagement with the disk knives 122. The feeding rolls 114 are preferably run at such a speed that the movement of the stalk, after being engaged by them, toward the knives is faster than the movement which is imparted to the stalk by the stripping and retaining screws. In this way after a stalk is fed into engagement with the rolls 114 it is quickly moved toward the knives 122 and thus all clogging is avoided. Since the rolls 114 move upwardly and toward the top or tassel the stalk is supported by the tassel and therefore the knives 122 cut the stalk at a predetermined and uniform distance below the top, which distance is independent of the length of the stalk.

By referring to Fig. 1 it will be noted that the elevator 109 terminates at a point in front of the last thread or helix on the screws 97 and 98. In this way the stalks will leave the elevator before they enter the recesses in the feeding rolls 114, and are allowed to drop down and be supported by their heads or tassels only and thus insure that the head shall always be a predetermined distance above the knives 122. Although the rolls 114 are preferably driven by a separate train of gearing in order that they may be driven at a higher speed and thereby prevent clogging, these rolls may be rigidly connected to the shafts 105 and thus the separate train of gearing 117, 118, 119 may be dispensed with.

After the tops have been cut off the stalks are discharged upon the elevator 126 which may load them upon a wagon or discharge them on the ground while the tops are discarded by means of the doffer wheels 124. In the construction shown in Fig. 9 the doffer wheels throw the tops on that part of the field which has been cleaned of the stalks.

By the adjusting means disclosed in Fig. 8 the distance of the knives, the gathering screws, and the inclined bridge 83 above the ground may be adjusted.

Although this machine is particularly adapted to cut, strip and top sugar cane it will be obvious that the machine can be used for cutting and stripping corn to prepare it for the cellulose and paper factories. It is therefore to be understood that I do not intend to limit the use of this machine to a particular kind of stalk, nor is this invention to be limited to the specific construction shown and described.

What I claim is:

1. In a harvester, in combination a gathering screw, a second shorter gathering screw mounted above the first, a support for said screws whereby they may be moved bodily over the ground, and means for rotating said screws at a pitch speed equal to their bodily movement.

2. In a harvester, in combination, a frame or support, a pair of gathering screws mounted on said support, one on each side of its median line, a second pair of screws shorter than the first pair mounted above said first pair, one on each side of the median line, but nearer to said line, and means for rotating said screws at a pitch speed equal to their bodily movement.

3. In a harvester, the combination with a frame, of gathering means on the front end thereof including a gathering screw, a hinged shaft for rotating said screw, and means for vertically adjusting said screw on said frame.

4. In a harvester, the combination with a frame, of a plurality of pairs of substantially horizontally arranged coöperating gathering screws on said frame and projecting and overhanging from the forward end thereof, one pair above the other, and means for rotating said screws.

5. In a harvester, the combination with a frame, of a plurality of pairs of substantially horizontally arranged gathering screws on said frame and projecting and overhanging from the forward end thereof, one pair above the other, means for rotating said screws, and means for vertically adjusting the lower pair of screws.

6. In a harvester, the combination with a frame, of a pair of substantially horizontally arranged gathering screws on said frame and projecting and overhanging from the forward end thereof, means for rotating said screws, and means for vertically adjusting said screws in unison.

7. In a harvester, in combination a frame or support, a stalk cutting knife, a pair of inwardly converging gathering bars for guiding the stalk to the knife, a pair of overhanging gathering screws coöperating with the bars for feeding the stalks along said bars to the knife, and means for rotating said screws at a pitch speed equal to their bodily movement.

8. In a harvester, in combination and arranged in series gathering means, a stalk cutter, stripping means receiving the stalks from gathering means and cutter, a top cutter, and means for feeding the stalks through the machine in an upright position to be operated upon by the stripping means and then the top cutter.

9. In a harvester, in combination, and arranged in series gathering means, a stalk cutter, stripping means receiving the stalks from gathering means and cutter, a top cutter, means for feeding the stalks through the machine in an upright position to be operated upon by the stripping means and then the top cutter, and a conveyer receiving the stalks from the top cutter.

10. In a harvester, in combination and arranged in series gathering means, a stalk cutter, stripping means receiving the stalks from gathering means and cutter, a top cutter, means for feeding the stalks through the machine in an upright position to be operated upon by the stripping means and then the top cutter, and a doffer wheel for discarding the tops.

11. In a harvester, in combination, a stalk cutter, combined rotary stripping and feeding mechanism, and gathering means for guiding the stalks in an upright position into the bite of the cutter and stripping mechanism.

12. In a harvester, in combination, a stalk cutter, combined rotary stripping and feeding mechanism, gathering means for guiding the stalks in an upright position into the bite of the cutter and the stripping mechanism, and stalk discharging mechanism receiving the stalks from said stripping mechanism.

13. In a harvester, in combination, a stalk cutter, rotary stripping mechanism, gathering means for guiding the stalks in an upright position into the bite of the cutter and the stripping mechanism, and topping mechanism receiving the stalks from said stripping mechanism.

14. In a harvester, in combination, a stalk cutter, rotary stripping mechanism, gathering means for guiding the stalks in an upright position into the bite of the cutter and the stripping mechanism, topping mechanism receiving the stalks from the said stripping mechanism, and stalk discharging mechanism receiving the stalks from said stripping and topping mechanisms.

15. In a harvester, in combination, a stalk cutter, combined rotary stripping and feeding mechanism, and gathering bars for guiding the stalks in an upright position into the bite of the cutter and stripping and feeding mechanism.

16. In a harvester, in combination, a stalk cutter, stripping and feeding mechanism including a pair of spaced rotating helical means for conveying the stalks in an upright position, and gathering means for guiding the stalks directly into the bite of said cutter and said helical member.

17. In a harvester, in combination, a stalk cutter, stripping and feeding mechanism including a pair of spaced rotating helical members, and gathering mechanism for guiding the stalks in an upright position into the bite of said cutter and said helical members, said cutter operating on the stalks when they are in the bite of the helical members.

18. In a harvester, in combination a stalk cutter, combined rotary stripping and feeding mechanism including means for rotating the stalks, and gathering means for guiding the stalks in an upright position into the bite of said stripping and feeding mechanism.

19. In a harvester, in combination, a stalk cutter, stripping and feeding mechanism including means for rotating the stalks, and gathering means for guiding the stalks in an upright position into the bite of said cutter and stripping and feeding mechanisms, said cutter operating on the stalks when they are in the bite of the stripping and feeding mechanism.

20. In a harvester, in combination, a stalk cutter, stripping and feeding mechanism including means for rotating the stalks, said rotating mechanism including a bar yieldingly movable transversely of the machine, gathering means for guiding the stalks in a substantially upright position into the bite of said cutter and stripping and feeding mechanisms and a guide member on said bar for guiding the stalks.

21. In a harvester, in combination, a stalk cutter, combined rotary stripping and feeding mechanism including means for rotating the stalks, said rotating means comprising a bar yieldingly movable transversely of the machine, gathering bars for guiding the stalks in an upright position into the bite of said cutter and said stripping and feeding mechanism, and a guide bar on said yielding bar for guiding the stalks.

22. In a harvester, in combination, a stalk cutter, stripping and feeding mechanism including means for rotating the stalks, said rotating mechanism including a bar yieldingly movable transversely of the machine, gathering means for guiding the stalks into the bite of said cutter and stripping and feeding mechanism, said gathering means including gathering bars and gathering screws, and a guide bar on said yielding bar for guiding the stalks.

23. In a harvester, in combination, a stalk cutter, combined rotary stripping and feeding mechanism including an inclined support for the stalks located rearwardly of said cutter and receiving the ends of the substantially upright stalks directly therefrom, and gathering means for guiding the stalks in a substantially upright position in the bite of said cutter and stripping and feeding mechanism.

24. In a harvester, in combination, a stalk cutter, combined rotary stripping and feeding mechanism including an inclined V-shaped stalk support located rearwardly of said cutter and receiving the ends of the substantially upright stalks directly therefrom, and gathering means for guiding the stalks into the bite of the cutter and stripping mechanism.

25. In a harvester, in combination, a stalk cutter, combined rotary stripping and feeding mechanism including an inclined stalk support located rearwardly of said cutter and receiving the ends of the upright stalks directly therefrom, gathering means for guiding the stalks into the bite of said cutter and stripping and feeding mechanism and means for adjusting the position of said cutter and support.

26. In a harvester, in combination, a stalk cutter, a carrier therefor, stripping and feeding mechanism including an inclined stalk support extending rearwardly from said cutter, said support being hinged at the rear end and resting at the front end on said cutter carrier whereby it receives the ends of the upright stalks directly from the cutter, and gathering means for guiding the stalks into the bite of said cutter and stripping and feeding mechanism.

27. In a harvester, in combination, a stalk cutter, stripping and feeding mechanism including spaced rotating helical members extending longitudinally of the machine and on opposite sides of a median line, an inclined V-shaped stalk support extending rearwardly from said cutter directly below the space between said helical members and adapted to receive the ends of the upright stalks directly from the cutter, said stripping and feeding means adapted to convey the stalks rearwardly through the machine and along said support, and gathering means for guiding the stalks into the cutter and stripping and feeding mechanism.

28. In a harvester, in combination with a support, of a knife, a platform located rearwardly of said knife, a gathering screw located forwardly of said knife and all sustained by said support, and means whereby all of said parts may be adjusted vertically.

29. In a harvester, stripping means, an inclined platform located below and adapted to support the stalks during the stripping operation, a knife at the lower end of the platform, a gathering screw for feeding the stalks to the knife and platform, and an adjustable support for the platform, knife and the gathering screw.

30. In a harvester, the combination with a main frame, of a stalk cutter thereon, a support in which said stalk cutter is journaled, a gathering screw journaled in said support, and means for vertically adjusting said support on said frame.

31. In a harvester, the combination with a main frame, of a plurality of stalk cutters thereon, supports in which said cutters are journaled, a pair of gathering screws journaled in said supports, and means for adjusting said supports vertically on said frame.

32. In a harvester, the combination with a main frame, of a stalk cutter thereon, a support in which said stalk cutter is journaled, a bridge hinged at one end on said main frame and resting at its other end on said support, a gathering screw journaled in said support, and means for vertically adjusting said support on said frame.

33. In a harvester, the combination with a main frame, of a pair of stalk cutters thereon, supports in which said stalk cutters are journaled, a bridge hinged at one end to said frame and resting at its other end on said support, a pair of gathering screws journaled in said supports, and means for vertically adjusting said supports on said frame.

In testimony whereof I affix my signature in presence of two witnesses.

AUGUST GERDES.

Witnesses:
R. H. BROWNE,
THOS. D. LANIGAN.